United States Patent
Rex et al.

(10) Patent No.: US 6,776,603 B1
(45) Date of Patent: Aug. 17, 2004

(54) BEAD CURING FINGER MOLD

(75) Inventors: William Allen Rex, Doylestown, OH (US); Kenneth Dean Conger, Stow, OH (US); Brian Joseph Wilson, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/980,835

(22) PCT Filed: Jul. 13, 1999

(86) PCT No.: PCT/US99/15940
§ 371 (c)(1),
(2), (4) Date: Nov. 15, 2001

(87) PCT Pub. No.: WO01/03912
PCT Pub. Date: Jan. 18, 2001

(51) Int. Cl.[7] .......................... B29C 35/02; B29D 30/48
(52) U.S. Cl. .................. 425/501; 156/136; 156/422; 425/520; 425/395
(58) Field of Search .................. 425/500, 501, 425/520, 395; 156/136, 422

(56) References Cited

U.S. PATENT DOCUMENTS

| | | | | |
|---|---|---|---|---|
| 948,064 A | * | 2/1910 | Seiberling et al. | 156/136 X |
| 3,552,711 A | * | 1/1971 | DeLaney et al. | 425/500 X |
| 4,510,113 A | | 4/1985 | Takano et al. | |
| 5,262,115 A | | 11/1993 | Tomlinson | |
| 5,422,064 A | * | 6/1995 | Tamura | 425/395 X |
| 5,798,127 A | | 8/1998 | Thayer et al. | |

* cited by examiner

Primary Examiner—Adrienne C. Johnstone
(74) Attorney, Agent, or Firm—Brouse McDowell; Roger D. Emerson

(57) ABSTRACT

A tire bundle is molded in a mold cavity formed by closing a mold having upper and lower mold halves with intermeshing fingers (20, 24) for enclosing bead wires and providing a molded bead ring for placing in a bead apex mold.

7 Claims, 6 Drawing Sheets

BEAD CURING FINGER MOLD

TECHNICAL FIELD

This invention related to molding a tire bead and especially to curing the rubber coating on the bead wires of a bead bundle which is held in a predetermined shape. The bead wires are held in place during the vulcanization so that when the bead ring is placed in a mold for injection molding of an apex on the bead, the mold will not be damaged by out of place wires. The bead bundle is also cured in a circular shape so that problems with pinching out of round beads are avoided during the closing of the bead apex mold.

BACKGROUND ART

Heretofore as shown and described in U.S. Pat. No. 5,798,127, a bead bundle of rubber coated bead wires has been placed in an apex mold and held in position by blades engaging the radially inner surface of the tire bead bundle. The apex-bead assembly is then formed by injection of rubber into the apex mold cavity of the apex mold. If the bead wires extend outwardly from the bead bundle, the mold may be damaged during closing causing shut down and costly repairs. With this method the unvulcanized bead bundle may be changed in shape by handling before placing in the apex mold. Also the bead bundle may be distorted and come apart during the injection process when rubber is being injected past the bead at high velocity and with great force.

Another object of the present invention is to provide a bead curing finger mold further characterized by the upper fingers and the lower fingers having sloped edges for guiding and compressing the bead bundle in a central position upon closing of the mold.

Another object of the present invention is to provide a bead curing finger mold further characterized by the upper fingers and the lower fingers having molding surfaces providing a circular molding member surface of the mold with a precise predetermined diameter of the bead bundle upon closing of the mold.

Another object of the present invention is to provide a bead curing finger mold wherein the bead bundle is a tire bead having a plurality of wires wrapped in a the bead bundle and coated with an elastomeric material further characterized by means for heating the mold for vulcanizing the elastomeric material.

Another object of the present invention is to provide a bead curing finger mold further characterized by the upper fingers and the lower fingers having extensions extending beyond the molding surfaces for guiding the bead bundle and providing recesses for receiving the extensions in the closed condition of the mold.

Another object of the present invention is to provide a bead curing finger mold further characterized by the lower finger mold half being raised to close the mold and the upper finger mold half has spaced apart spring loaded ejector fingers for retracting upon closing of the mold and for extension upon opening of the mold to transfer the bead bundle to the lower finger mold half.

Another object of the present invention is to provide a bead curing finger mold further characterized by the lower mold half having circumferentially spaced apart ejectors and bead holders extending upwardly through the lower finger mold half for holding the bead bundle in the lower position of the lower finger mold half prior to closing of the mold and ejecting the bead bundle upon lowering of the upper mold half after vulcanization of the bead bundle.

In U.S. Pat. No. 5,262,115, an apex bead assembly mold for injection molding the apex assembly is shown where the rubber coated bead bundles are held in place on a cylindrical core by spaced-apart coaxial round rings arranged in side by side relation and engaging the axially extending inner surfaces and the radially extending inner surfaces of the beads so that when half molds are mounted around the core with the beads held in place, apex portions may be injection molded. Thereafter, the mold halves are removed and the bead apex assemblies pulled off the rings. During the injection process the unprotected bead bundle of unvulcanized rubber may be distorted or come apart due to high velocity movement of the rubber past of the bead.

DISCLOSURE OF THE INVENTION

This invention relates to a mold for heating and enclosing a circular member comprising a first mold member, a second mold member movable into engagement with the first mold member to provide a mold cavity characterized by the first mold member having a plurality circumferentially spaced first fingers, the second mold member having a plurality of circumferentially spaced second fingers movable into meshing engagement with the first fingers upon closing of the mold by movement of the first mold member towards the second mold member providing a circular mold cavity for the circular member.

This invention further relates to a bead curing finger mold characterized by a plurality of circumferentially spaced lower fingers disposed in a lower ring, a plurality of circumferentially spaced upper fingers disposed in an upper ring, the lower ring being positioned in a generally horizontal position for supporting a bead bundle, and the upper ring being positioned over the lower ring with the lower fingers interposed between the upper fingers in a closed position of the mold for containing and guiding the bead bundle and providing spaces along the lower fingers and the upper fingers to accommodate variations in size of the bead bundle.

This invention is also directed to the construction of a tire bead comprising multiple revolutions of metal wires coated with rubber and wound in a circular configuration to form a bead bundle characterized by the bead bundle being cured in a bead curing finger mold having a plurality of circumferentially spaced lower fingers disposed in a lower ring in a generally horizontal lower position for supporting the bead bundle, a plurality of circumferentially spaced upper fingers disposed in a generally horizontal upper ring positioned over the lower ring with the lower fingers interposed between the upper fingers in the closed position of the mold for containing and guiding the wires of the bead bundle and providing spaces along the lower fingers and the upper fingers to accommodate variations in size of the bead bundle during vulcanization of the bead upon application of heat to bead curing finger mold.

DETAILED DESCRIPTION OF THE INVENTION

Figure 1:
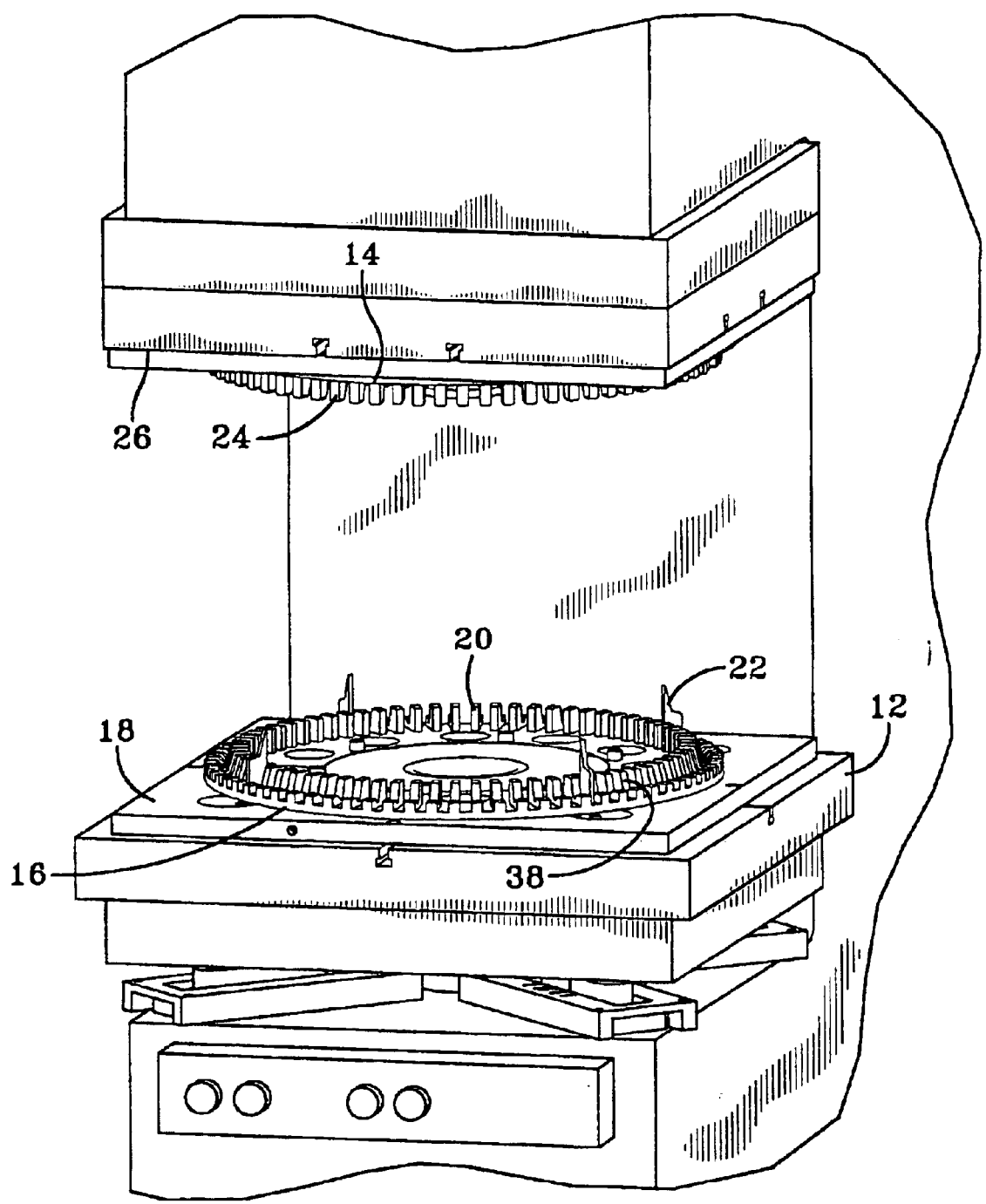
FIG. 1 is a front view in perspective of a finger mold embodying the invention shown mounted in a press.

Referring to FIG. 1, a bead curing finger mold 10 embodying the invention is mounted in a hydraulic press 12 and has an upper finger mold half 14 and a lower finger mold half 16 movable together and apart upon opening and closing of the press. In the embodiment shown, the press 12 provides a pressure of 7 tons (7.11 metric tons) plus or minus 5 tons (5.08 metric tons) and the diameter of the bead is 22.50 inches (57.15 cm), however, with this press, medium radial truck tire beads of diameters having a range of 17.50 inches (44.45 cm) to 24.5 inches (62.23 cm) may be molded with finger molds of this type.

Referring to FIGS. 1–4, the lower finger mold half 16 is mounted on a bottom press plate 18 and includes a plurality of circumferentially spaced apart lower fingers 20. Vertically movable ejector and bead holders 22 are mounted in the bottom press plate 18 at circumferentially spaced positions around the lower finger mold half 16 for holding a bead bundle 23 prior to closing the press 12 and ejecting the vulcanized bead after the curing cycle.

Figure 2:
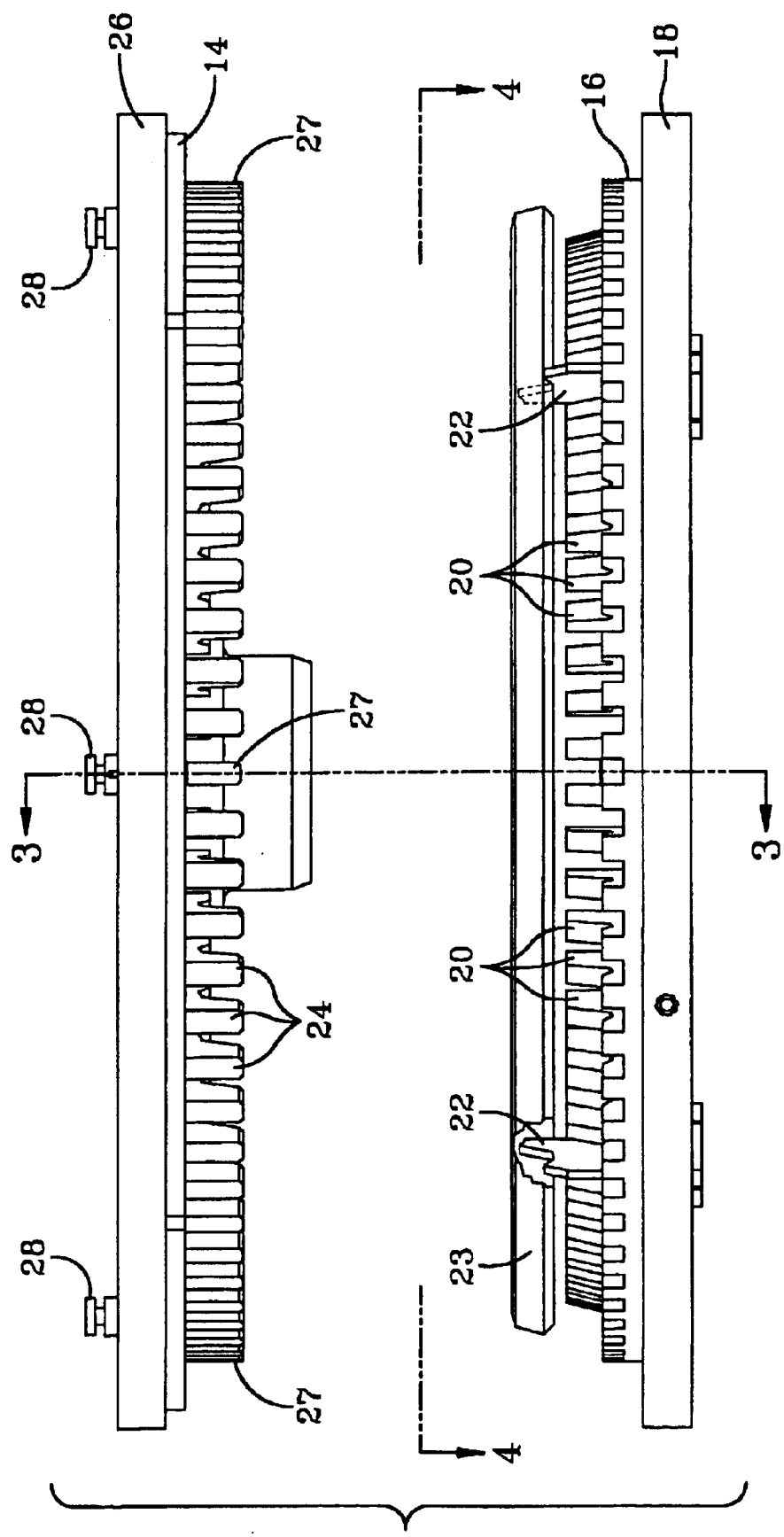
FIG. 2 is an elevation with parts broken away of the upper and lower mold halves shown in FIG. 1 removed from the press with the bead ring shown lifted from the lower mold.
Figure 3:
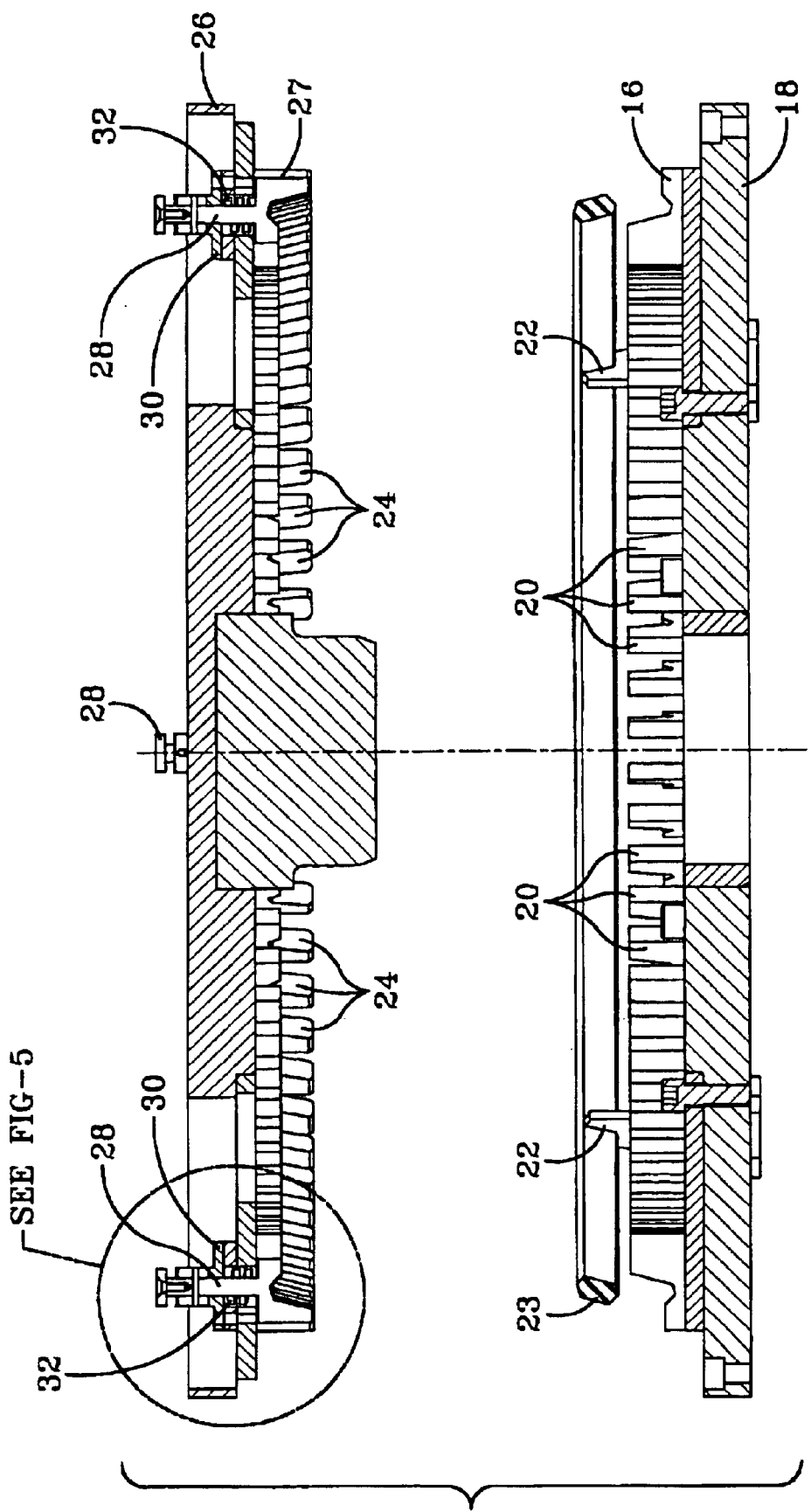
FIG. 3 is a cross sectional view of the molds taken along the plane of line 3—3 in FIG. 2.
Figure 4:
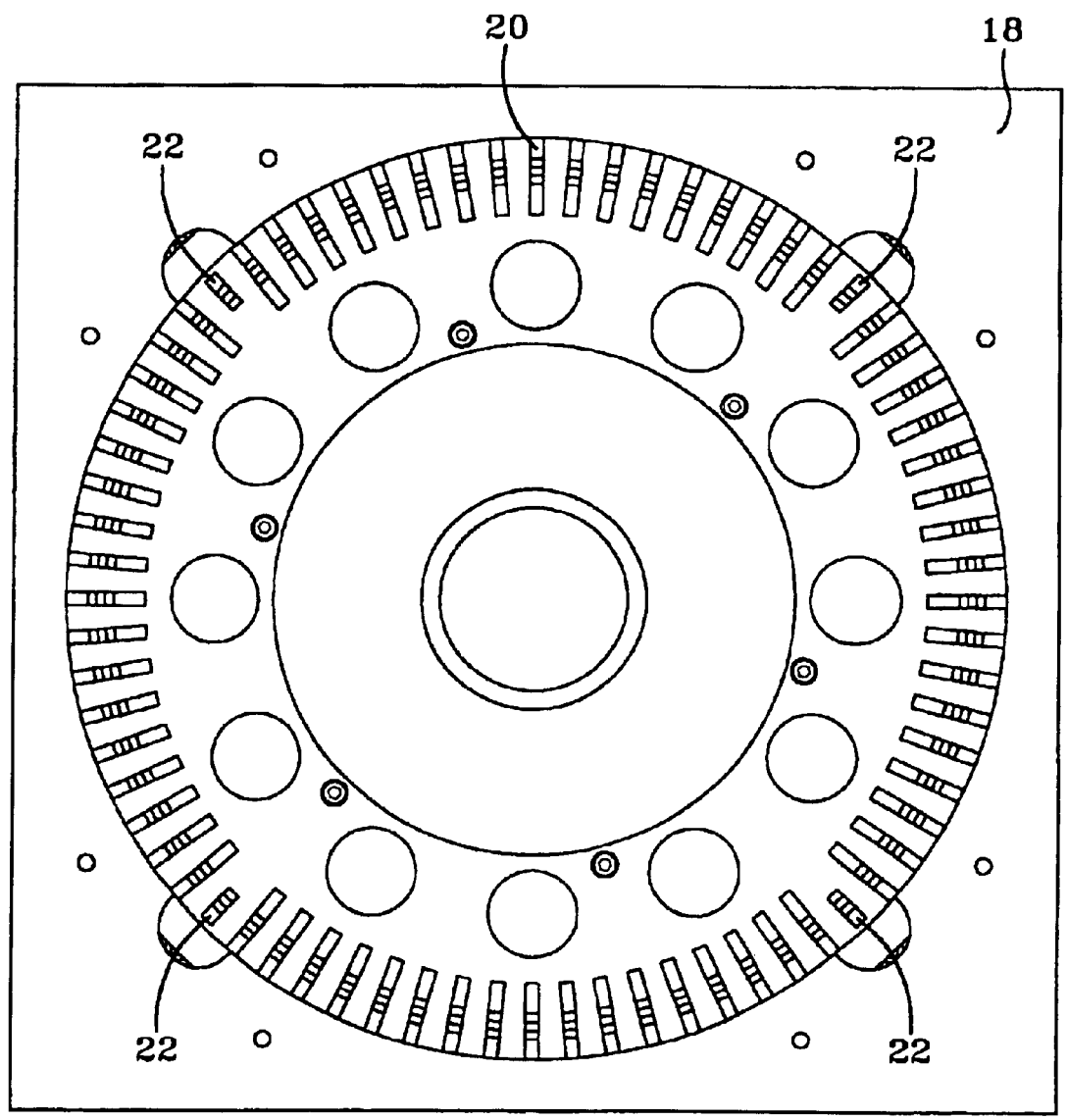
FIG. 4 is a plan view of the lower mold half taken along the plane of line 4—4 in FIG. 2.
Figure 5:
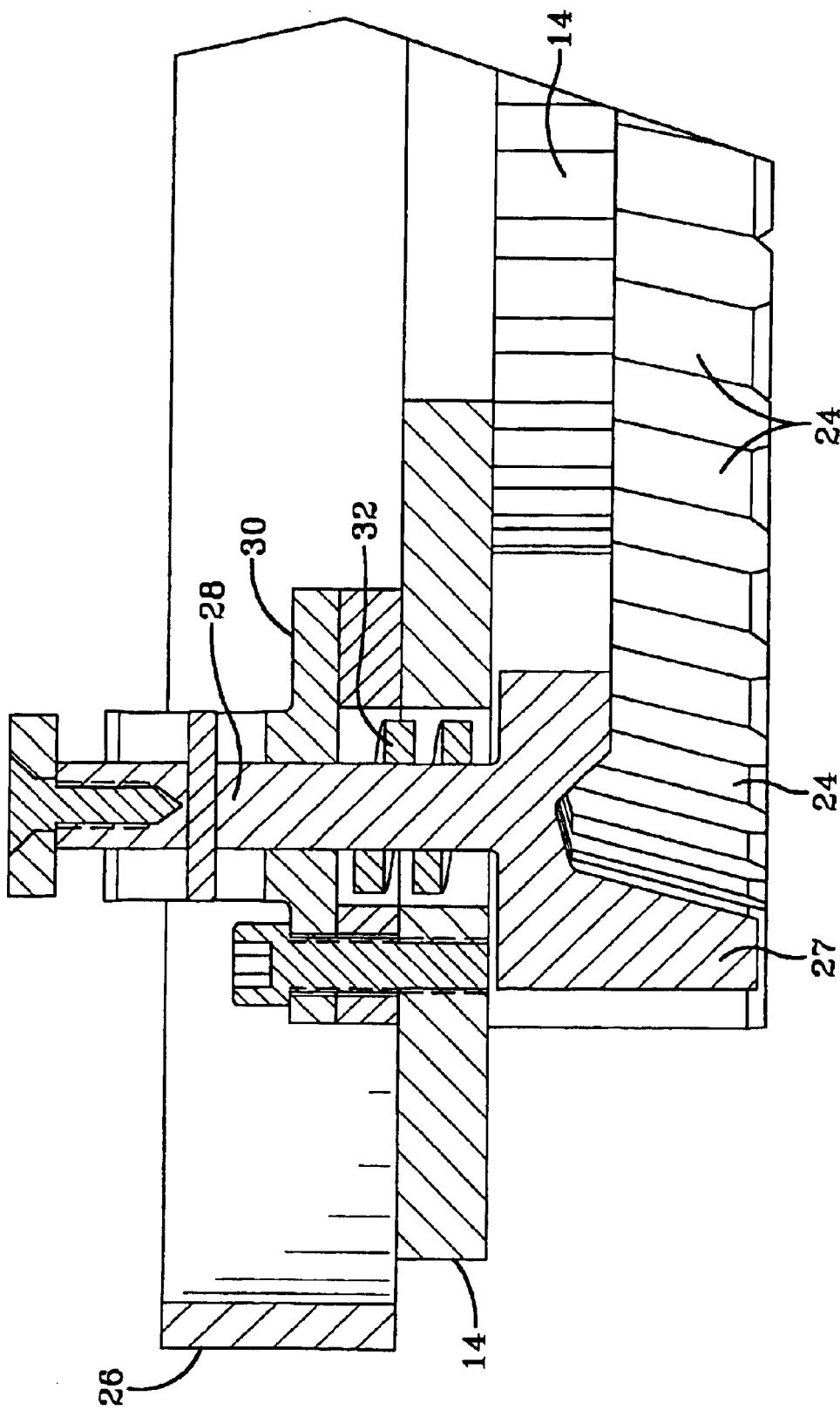
FIG. 5 is an enlarged fragmentary sectional view of the spring for removing the bead from the upper mold half.
Figure 7:
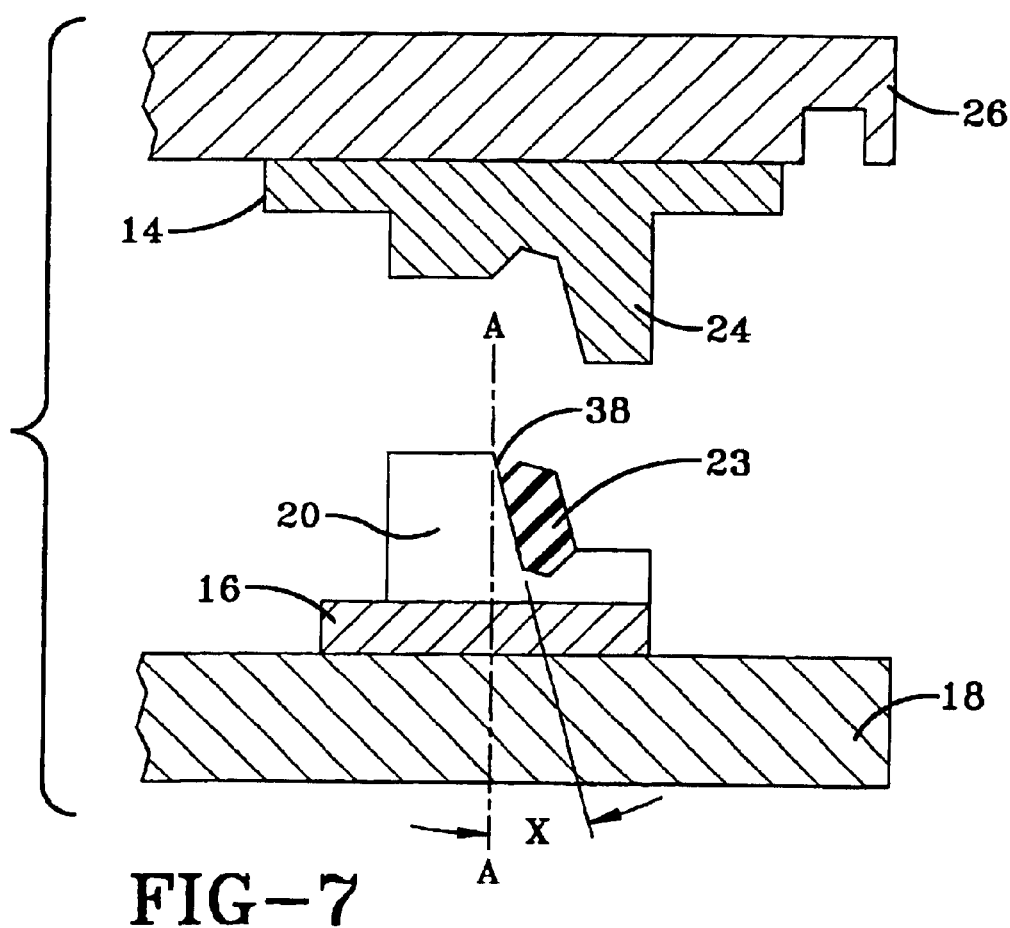
FIG. 7 is a view like FIG. 6 showing the bead ring after molding and before removal from the lower finger mold half.

Referring to FIGS. 2, 3 and 5, the upper finger mold half 14 has a plurality of circumferentially spaced upper fingers 24 mounted on a top press plate 26 of the press 12. Four spaced apart upper ejector fingers 27 are individually slidably supported and are spring loaded on the upper finger mold half 14 and have four posts 28 slidably mounted in collars 30, fastened to the upper finger mold half 14. Coil springs 32 are disposed between the collars 30 and the upper ejector fingers 27 to urge the ejector fingers downward into engagement with the bead bundle 23 to eject the bead bundle and separate the bead bundle from the upper mold half 14 as the mold 10 opens. In operation, the press 12 is opened to the position shown in FIG. 1 with the ejector and bead holders 22 in a position above the lower finger mold half 16. The bead bundle 23 is then placed over the lower fingers 20 on the bead holders 22. The bead bundle 23 comprises a ring of bead wires wound and coated with rubber in a bead ring in a manner well-known in the art. The bottom press plate 18 is then raised vertically lifting the bead bundle 23 off the ejector and bead holders 22. As shown in FIG. 7, tapered side surfaces 38 of the lower fingers 20 preferably have the same slope as a bead surface 40 relative to the axial direction A—A, which in this embodiment is an angle X of 15 degrees. However, in other embodiments, this angle may range from 0 to 45 degrees. The angle X is normally the same angle as the angle of the surface of the rim of the wheel on which the tire having this bead bundle 23 is mounted.

Figure 6:
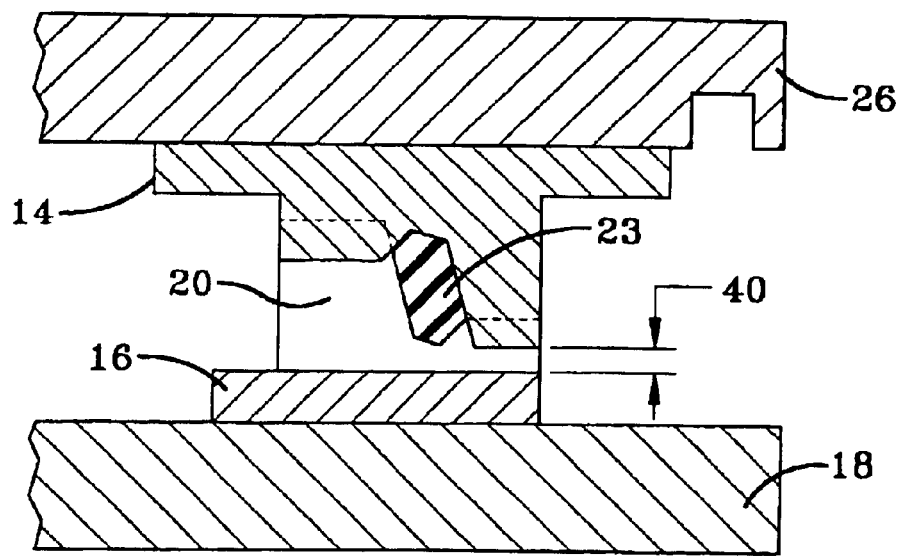
FIG. 6 is an enlarged fragmentary schematic sectional view of the upper and lower finger mold halves shown in FIG. 2 with the bead bundle held by the fingers without bottoming of the finger mold halves.

The press 12 is closed with the bottom mold plate 18 raised into a seating position with the top press plate 26. The lower finger mold half 16 is raised into position so that the lower fingers 20 are in meshing engagement with the upper fingers 24 as shown in FIG. 6. Steam or other heat transmitting material may then be provided in the press for vulcanizing the bead bundle 23 into a compact bead.

As shown in FIGS. 6 and 7, during the closing operation the movement of the lower finger mold half 14 upward towards the upper finger mold half 14 is stopped by the compression of the bead bundle 23. There is no bottoming out of the upper finger mold half 14 against the lower finger mold half 16. This is advantageous because it provides a compact bead ring even though there may be variations in the size of the bead bundle 23. Variations may be accommodated in spaces 40 at the edges of the upper fingers 24 and lower fingers 20.

After vulcanization, the press 12 is opened and the springs 32 urge the ejector fingers 27 downward ejecting the bead bundle 23 as the press 12 opens. The ejector and bead holders 22 protrude through the lower finger mold half 16 and lift the vulcanized bead bundle 23 to the position shown in FIGS. 2 and 3 as the bottom mold plate 18 is lowered.

While a certain representative embodiment and details have been shown for the purpose of illustrating the invention, it will be apparent to those skilled in the art that various changes and modifications may be made therein without departing from the spirit or scope of the invention.

Having thus described the invention it is now claimed:

What is claimed is:

1. A bead curing finger mold comprising a plurality of circumferentially spaced lower fingers disposed in a lower finger mold half, a plurality of circumferentially spaced upper fingers disposed in an upper finger mold half, said lower finger mold half being positioned in a generally horizontal position for supporting a bead bundle, and said upper finger mold half being positioned over said lower finger mold half with said lower fingers being interposed between said upper fingers in a closed position of said mold for containing and guiding said bead bundle and providing spaces along said lower fingers and said upper fingers to accommodate variations in size of said bead bundle.

2. A bead curing finger mold according to claim 1 further characterized by said lower finger mold half being raised to close said mold and said upper finger mold half has spaced apart spring loaded ejector fingers for retracting upon closing of said mold and for extension upon opening of said mold to transfer said bead bundle to said lower finger mold half.

3. A bead curing finger mold according to claim 1 further characterized by said lower finger mold half having circumferentially spaced apart ejectors and bead holders extending upwardly through said lower finger mold half for holding said bead bundle in the lower position of said lower finger mold half prior to closing of said mold and ejecting said bead bundle upon lowering of said upper mold half after vulcanization of said bead bundle.

4. A bead curing finger mold according to claim 1 further characterized by said upper fingers and said lower fingers having sloped edges for guiding and compressing said bead bundle in a central position upon closing of said mold.

5. A bead curing finger mold according to claim 4 further characterized by said upper fingers and said lower fingers having molding surfaces providing a circular molding member surface of said mold with a precise predetermined diameter of said bead bundle upon closing of said mold.

6. A bead curing finger mold according to claim 5 wherein said bead bundle is a tire bead having a plurality of wires wrapped in said bead bundle and coated with an elastomeric material further characterized by means for heating said mold for vulcanizing said elastomeric material.

7. A bead curing finger mold according to claim 5 further characterized by said upper fingers and said lower fingers having extensions extending beyond said molding surfaces for guiding said bead bundle and providing recesses for receiving said extensions in the closed condition of said mold.

* * * * *